(12) United States Patent
Eyb et al.

(10) Patent No.: US 10,066,491 B2
(45) Date of Patent: Sep. 4, 2018

(54) FIBRE COMPOSITE COMPONENT FOR THE ROTOR BLADE OF A WIND TURBINE

(71) Applicant: SENVION SE, Hamburg (DE)

(72) Inventors: Enno Eyb, Kiel (DE); Urs Bendel, Fockbek (DE); Hendrik Mester, Kiel (DE)

(73) Assignee: Senvion SE, Hamburg (DE)

( * ) Notice: Subject to any disclaimer, the term of this patent is extended or adjusted under 35 U.S.C. 154(b) by 339 days.

(21) Appl. No.: 14/674,947

(22) Filed: Mar. 31, 2015

(65) Prior Publication Data

US 2015/0204200 A1    Jul. 23, 2015

Related U.S. Application Data

(63) Continuation of application No. PCT/EP2013/002881, filed on Sep. 26, 2013.

(30) Foreign Application Priority Data

Oct. 1, 2012  (DE) .................. 10 2012 217 904

(51) Int. Cl.
*B29C 70/68* (2006.01)
*F01D 5/28* (2006.01)
*F03D 1/06* (2006.01)

(52) U.S. Cl.
CPC ........... *F01D 5/282* (2013.01); *F03D 1/0683* (2013.01); *Y02E 10/721* (2013.01)

(58) Field of Classification Search
CPC ........ F01D 5/282; F03D 1/0683; F03D 13/10; F03D 1/0675; Y02E 10/721

(Continued)

(56) References Cited

U.S. PATENT DOCUMENTS 8,191,255 B2 * 6/2012 Kristensen .......... F03D 11/0033
29/889
8,506,258 B2 * 8/2013 Baker ................. F03D 1/0675
416/226

(Continued)

FOREIGN PATENT DOCUMENTS

EP    2110552 A1    10/2009
EP    2341241 A1    7/2011

(Continued)

OTHER PUBLICATIONS

International Search Report dated Jan. 15, 2014 in corresponding International Patent Application No. PCT/EP2013/002881, Filed Sep. 26, 2013.

*Primary Examiner* — Logan Kraft
*Assistant Examiner* — Brian Delrue
(74) *Attorney, Agent, or Firm* — Rankin, Hill & Clark LLP

(57) ABSTRACT

A composite fiber component for a rotor blade of a wind power plant including a first sandwich core and a second sandwich core arranged next to each other, each having an inside facing a rotor blade interior and an outside facing a rotor blade exterior. A first fiber-containing laminate layer is arranged on the inside of the first sandwich core and on the outside of the second sandwich core. A second fiber-containing laminate layer is arranged on the outside of the first sandwich core and on the outside of the second sandwich core. And, a third fiber-containing laminate layer is arranged on the inside of the first sandwich core and on the inside of the second sandwich core. Also disclosed is a rotor blade for a wind power plant having a composite fiber component as disclosed.

7 Claims, 2 Drawing Sheets

(58) Field of Classification Search
USPC .................................................. 416/230, 229
See application file for complete search history.

(56) References Cited

U.S. PATENT DOCUMENTS

| | | | | |
|---|---|---|---|---|
| 8,789,275 B2* | 7/2014 | Esaki | .................... | F03D 1/0675 29/889.7 |
| 9,599,094 B2* | 3/2017 | Dahl | .................... | B29C 70/543 |
| 2007/0251090 A1* | 11/2007 | Breugel | .................. | B29C 70/30 29/889.7 |
| 2008/0075603 A1* | 3/2008 | Van Breugel | ......... | B29C 65/542 416/232 |
| 2008/0118365 A1* | 5/2008 | Bendel | .................. | F03D 1/0658 416/244 R |
| 2009/0169392 A1* | 7/2009 | Kuroiwa | ............... | F03D 1/0675 416/241 A |
| 2009/0257881 A1* | 10/2009 | Ostergaard Kristensen | ................ | F03D 11/0033 416/229 R |
| 2010/0062238 A1* | 3/2010 | Doyle | .................... | B29C 70/02 428/295.1 |
| 2011/0142679 A1* | 6/2011 | Bendel | .................. | B29C 66/721 416/241 R |
| 2012/0093656 A1* | 4/2012 | Esaki | .................... | F03D 1/0675 416/229 R |
| 2012/0141282 A1* | 6/2012 | Esaki | .................... | F03D 1/0675 416/224 |
| 2012/0321482 A1* | 12/2012 | Friedrich | .............. | F03D 1/0641 416/241 R |

FOREIGN PATENT DOCUMENTS

| | | |
|---|---|---|
| EP | 2444660 A1 | 4/2012 |
| JP | S61192866 A | 8/1986 |

* cited by examiner (A-A)

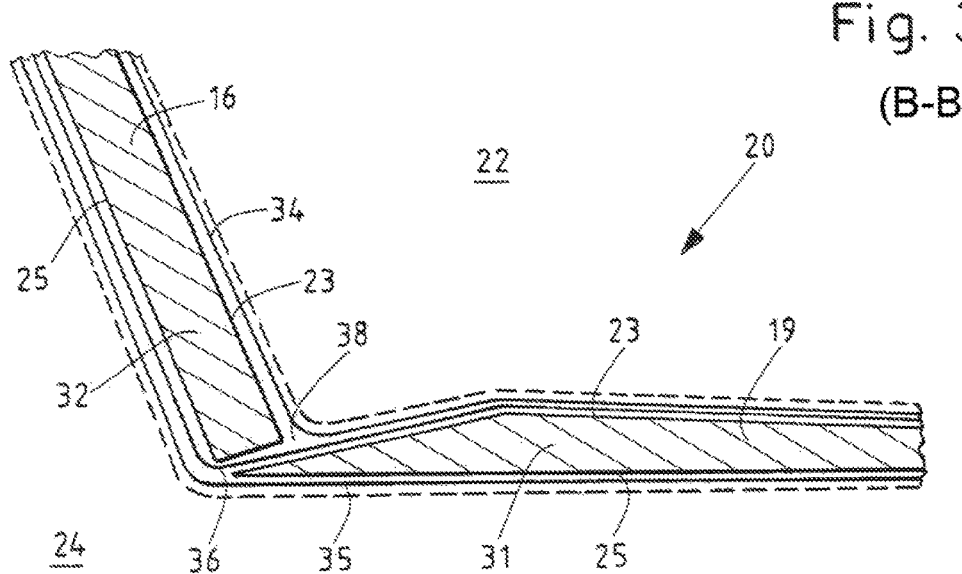
Fig. 3 (B-B)
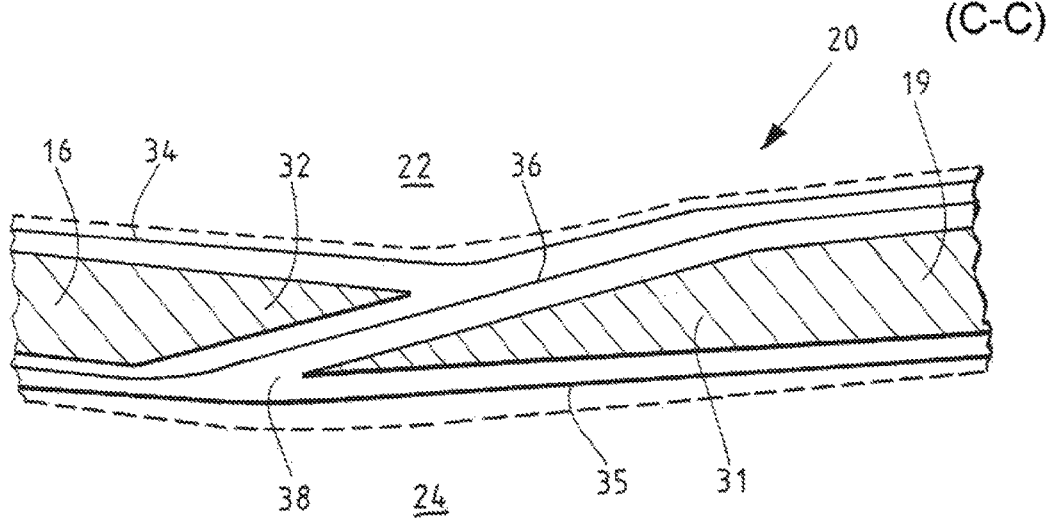
Fig. 4 (C-C)

FIBRE COMPOSITE COMPONENT FOR THE ROTOR BLADE OF A WIND TURBINE

CROSS REFERENCE TO RELATED APPLICATIONS

This application is a continuation of PCT/EP2013/002881, filed Sep. 26, 2013, and claims priority to DE 10 2012 217 904.6, filed Oct. 1, 2012.

BACKGROUND OF INVENTION

Field of Invention

The invention relates to a composite fiber component for a rotor blade of a wind power plant. The invention relates, furthermore, to a rotor blade for a wind power plant.

Brief Description of Related Art

Rotor blades for wind power plants are known, which are composed of a plurality of individual parts manufactured in the composite fiber type of construction and glued together to form a rotor blade. The individual parts sometimes have considerable dimensions and are usually sheet-like, that is to say that the thickness is substantially smaller than the length and width.

Typical rotor blades are composed of at least two rotor blade shells which stipulate the external shape and therefore the essential aerodynamic properties of the rotor blade. For example, a rotor blade shell is provided for the suction side of the rotor blade, what is known as the top shell, and a rotor blade shell is provided for the pressure side of the rotor blade, what is known as the bottom shell.

The rotor blade shells are conventionally reinforced in the region of the largest profile thickness of the rotor blade by means of what are known as girders and are connected to one another in the region of the girders by means of main webs. The girders and the main webs in this case form the essential load-bearing structure of the rotor blade, whereas the rotor blade shells are otherwise made relatively lightweight and thin as sandwich laminates. In this case, for example, layers of fiber-reinforced composite materials are laminated on both sides onto a lightweight sandwich core composed, for example, of balsa wood.

Known rotor blades often have, particularly in the region of transition to the blade root, portions in which the aerodynamic profile has a profile end face which is also designated as a truncated trailing edge. In these portions, therefore, the profile does not have a trailing edge tapering to a point, but instead terminates in a closing-off face which is arranged transversely to the profile chord and which, particularly so as to form sharp edges, merges into the rotor blade shells on the suction side and the pressure side of the profile. The transitional edges run essentially in the longitudinal direction of the rotor blade and are exposed to considerable loads during operation.

If the edges are formed as a continuous sandwich laminate bent at the edge, there is only low component resistance to flexural or bending loads. Moreover, under relatively high loads, there is the threat in the sandwich laminate of delaminations which may lead to sudden component failure.

In the prior art, therefore, as a rule, the rotor blade shells for the suction and the pressure side and also the closing-off face are manufactured as separate components in the sandwich laminate type of construction. The individual components are subsequently glued to one another to form the transitional edges, and the adhesive joints or the transitional edges are overlaminated again in order to increase stability. This manufacturing method is characterized by a long cycle time because the individual method steps cannot be carried out in parallel. Moreover, complicated fixtures are required for the insertion and orientation of the closing-off face between the rotor blade shells.

BRIEF SUMMARY OF THE INVENTION

Based on this prior art, the object of the present invention is to increase the mechanical load-bearing capacity of rotor blades and to simplify and accelerate manufacture.

This object is achieved by means of a composite fiber component for a rotor blade of a wind power plant, comprising a first sandwich core and a second sandwich core arranged next to the first sandwich core, the sandwich cores having in each case an inside facing the rotor blade interior and an outside facing the rotor blade exterior, the composite fiber component comprising, furthermore, a first fiber-containing laminate layer which is arranged, in the case of the first sandwich core, on the inside of the first sandwich core and, in the case of the second sandwich core, on the outside of the second sandwich core, a second fiber-containing laminate layer which is arranged, in the case of the first sandwich core, on the outside of the first sandwich core and, in the case of the second sandwich core, on the outside of the second sandwich core, and a third fiber-containing laminate layer which is arranged, in the case of the first sandwich core, on the inside of the first sandwich core and, in the case of the second sandwich core, on the inside of the second sandwich core.

The fiber-containing laminate layers contribute decisively to the stability of the composite fiber component. Fiber-containing laminate layers in the context of the invention are, in particular, layers of fiber-reinforced composite material or composite fiber material. Known composite fiber materials, for example glass fiber-reinforced plastics (GFRP) or carbon fiber-reinforced plastics (CFRP), are distinguished by high structural stability and low weight. Moreover, composite fiber materials can advantageously be shaped in virtually any desired way.

A sandwich core in the context of the invention is, in particular, a layer of the sandwich laminate composed of a lightweight material, such as, for example, plastic, foam or balsa wood. The sandwich cores of the composite fiber component according to the invention have, in particular, the function of keeping the laminate layers of the composite fiber component at a stipulated distance from one another. As a result, in particular, the surface stability of the composite fiber component is further increased.

One advantage of the invention is that the first laminate layer, which according to the invention is arranged, in the case of the first sandwich core, on the inside and, in the case of the second sandwich core, on the outside, stabilizes the connection region between the two sandwich cores. For this purpose, the first laminate layer runs, in particular, uninterruptedly from the inside of the first sandwich core through between the two sandwich cores to the outside of the second sandwich core. The first laminate layer according to the invention in this case fulfills, in particular, a clamping function between the two sandwich cores. The invention thereby ensures that the sandwich laminate has sufficient stability even when the composite fiber component has an edge at the connection of the first sandwich core and the second sandwich core.

A further advantage of the invention is that the corresponding component can be manufactured in one operation and the connection point between the two sandwich cores does not subsequently have to be reinforced.

In the context of the invention, the inside of a sandwich core designates, in particular, a side or side face of the sandwich core which faces the interior of the rotor blade during the intended use of the composite fiber component according to the invention in a rotor blade of a wind power plant. Correspondingly, the outside of a sandwich core designates, in particular, that side of the sandwich core which faces away from the inside.

The first laminate layer, the second laminate layer and/or the third laminate layer preferably comprise in each case at least one ply of fiber material which is embedded in a matrix of cured matrix material.

The arrangement of the fiber material of the laminate layers in plies has, in particular, manufacturing advantages. For example, the orientation of the fibers, which critically determines the stability of the composite fiber component, can be more easily stipulated and monitored when the fibers are arranged in plies. Also, depending on the actual composite fiber component, the arrangement of the fibers in plies makes it possible, by means of additional fibers or fiber material plies, to reinforce the regions or portions of the laminate layers which are subjected to especially high load.

The matrix material is understood in the context of the invention to mean, in particular, originally flowable natural or synthetic resins which, in particular, cure under the action of air, heat and/or light, including the action of UV light. Fiber material designates, in particular, a glass fiber semifinished product, carbon fiber semifinished product or synthetic fiber semifinished product in the form of fiber mats, woven fabrics, contextures, fleece or continuous fibers. The manufacture of the composite fiber component according to the invention may take place, both using resin-impregnated fiber material, what are known as prepregs, and using dry fiber material which, for example, is impregnated with resin in a vacuum infusion method.

The mechanical stability of the composite fiber component according to the invention is advantageously increased further if the first laminate layer, the second laminate layer and the third laminate layer have a common matrix of cured matrix material. In particular, advantageously, the fiber material or the fibers of the fiber material of the three laminate layers are embedded in a single matrix of cured matrix material. Thus, in particular, delamination or peeling of individual laminate layers within the sandwich laminate is effectively prevented.

Preferably, the first sandwich core and the second sandwich core are arranged, in particular in regions, at an angle to one another or are arranged angularly with respect to one another. What is achieved thereby, in particular, is that the sandwich laminate in the region of the first sandwich core and the sandwich laminate in the region of the second sandwich core stabilize one another. The angle preferably lies in a range of between 10° and 170°, in particular of between 25° and 165°.

The composite fiber component according to the invention is or comprises a rotor blade shell or a rotor blade part shell as a preferred application of the invention.

In a furthermore preferred embodiment of the invention, the composite fiber component is or comprises a rotor blade shell or a rotor blade part shell and/or a closing-off web for a profile end face of the rotor blade or a region of the rotor blade in which an aerodynamic profile of the rotor blade has a truncated trailing edge.

This is usually the case, for example, in the near-hub region, that is to say in the transitional region toward the rotor blade root.

The object on which the invention is based is also achieved by means of a rotor blade for a wind power plant, having a composite fiber component according to the invention.

Preferably, the rotor blade according to the invention comprises an, in particular, near-hub region, in which an aerodynamic profile of the rotor blade has a profile end face, in particular a truncated trailing edge.

Furthermore, there is preferably provision whereby the composite fiber component according to the invention is arranged in that region of the rotor blade in which an aerodynamic profile of the rotor blade has a profile end face, in particular a truncated trailing edge.

Further features of the invention become clear from the description of embodiments according to the invention, together with the claims and the accompanying drawings. Embodiments according to the invention may fulfill individual features or a combination of a plurality of features.

BRIEF DESCRIPTION OF THE DRAWINGS

The invention is described below, without the general idea of the invention being restricted, by means of exemplary embodiments with reference to the drawings, while, in regard to all the particulars of the invention not explained in any more detail in the text, reference is made expressly to the drawings in which:

FIG. 3 shows diagrammatically a sectional illustration of the sandwich laminate of the rotor blade according to the invention along the line B-B in FIG. 1, and FIG. 4 shows diagrammatically a sectional illustration of the sandwich laminate of the rotor blade according to the invention along the line C-C in FIG. 1.

In each case identical or similar elements and/or parts are given the same reference numerals in the drawings, and therefore there is no need in each case to introduce them again.

DETAILED DESCRIPTION OF THE INVENTION

Figure 1:
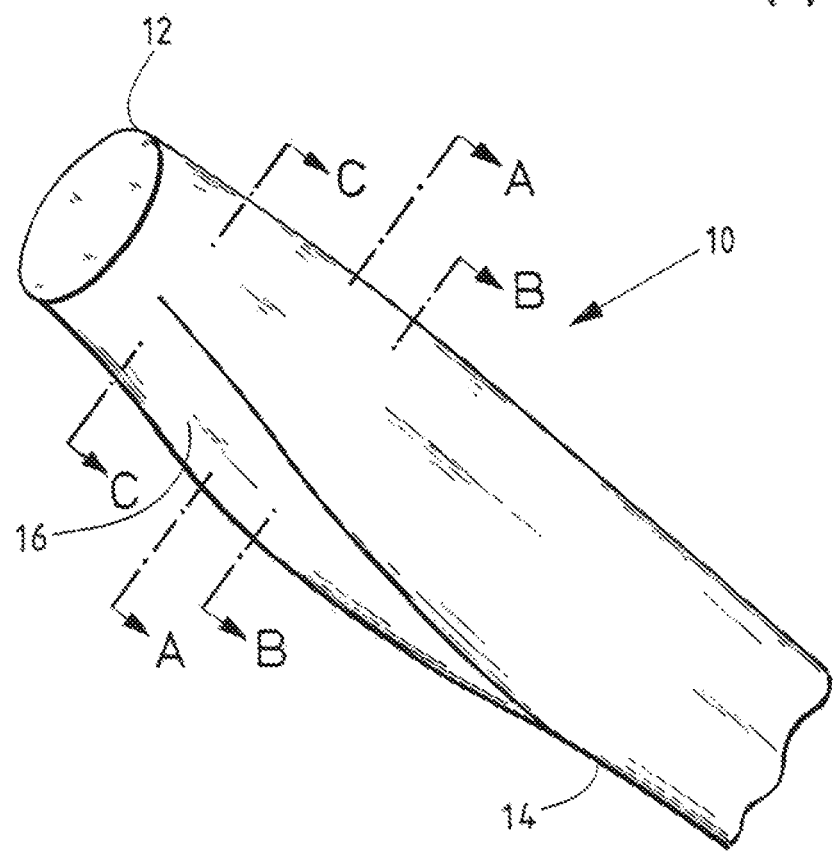
FIG. 1 shows diagrammatically a near-hub region of a rotor blade according to the invention.

FIG. 1 shows diagrammatically the near-hub region of a rotor blade 1 according to the invention.

The rotor blade has a blade root 12 of round cross section for connecting the rotor blade 10 to a hub of a wind power plant. Behind the blade root 12 along the longitudinal extent of the rotor blade 10, the rotor blade 10 has in cross section an aerodynamic profile which varies with the distance from the blade root 12. Only at some distance, for example a plurality of meters, behind the blade root 12 does the rotor blade 10 have an aerodynamic profile with a trailing edge 14 tapering to a point. By contrast, in the transitional region lying in front, the rotor blade 10 has an aerodynamic profile with a profile end face, in particular with a truncated trailing edge, that is to say the aerodynamic profile terminates or is closed off by a closing-off web 16 arranged transversely to the profile chord.

Figure 2:
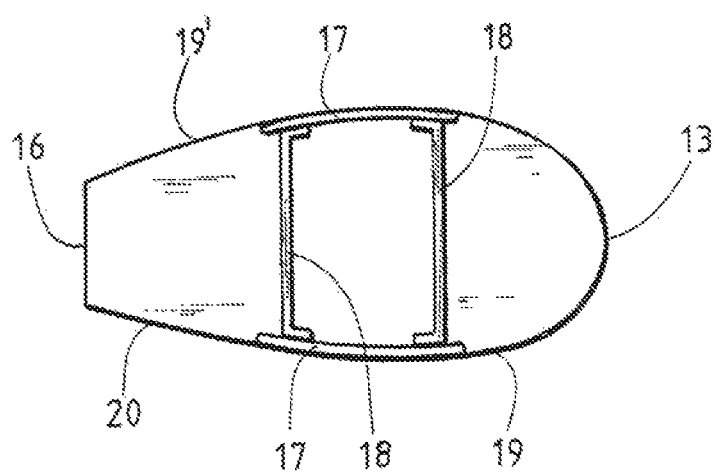
FIG. 2 shows diagrammatically a sectional illustration of the rotor blade according to the invention along the line A-A in FIG. 1.

FIG. 2 shows diagrammatically a sectional illustration of the rotor blade 10 in this region along the line A-A illustrated in FIG. 1.

The load-bearing structure of the rotor blade 10 comprises two girders 17 which, together with two webs 18, form a stable box structure. The outer envelope of the rotor blade 10 comprises rotor blade shells 19, 19' which are connected, for example glued, to the load-bearing structure composed of the girders 17 and of the webs 18. Alternatively, for example, the girders 17 may be integrated into the rotor blade shells 19, 19'.

Typically, at least two rotor blade shells, the bottom shell 19 on the pressure side and the top shell 19' on the suction side of the rotor blade, are provided. It is in this case unimportant for the invention whether the rotor blade shells 19, 19' extend in one piece over the entire length of the rotor blade 10 or are composed of a plurality of rotor blade part shells.

The flow impinges upon the rotor blade 10 in the region of the profile nose 13. Located at that end of the aerodynamic profile which is at the rear in the flow impingement direction is a sheet-like closing-off web 16 arranged transversely to the profile chord.

In the example shown of a rotor blade 10 according to the invention, the bottom shell 19 and the closing-off web 16 are integral parts of a common composite fiber component 20 in a sandwich laminate type of construction.

FIG. 3 shows the set-up of the sandwich laminate of the composite fiber component 20 in a diagrammatic sectional illustration along the line B-B in FIG. 1.

The composite fiber component 20 comprises a first sandwich core 31 for the bottom shell 19 and a second sandwich core 32 for the closing-off web 16. The sandwich cores 31, 32 comprise, for example, laths or boards made of balsa wood and are of essentially sheet-like form. Thus, in each case, an inside 23 of the sandwich cores 31, 32 faces the rotor blade interior 22 and an outside 25 of the sandwich cores 31, 32 faces the rotor blade exterior 24.

The sandwich cores 31, 32 are arranged next to one another at an angle to one another, a gap remaining between the sandwich cores 31, 32. The sandwich core 31 is of wedge-shaped form at the margin, so that the gap between the sandwich cores 31, 32 arranged at an angle to one another has an essentially constant gap width.

The sandwich laminate of the composite fiber component 20 comprises, furthermore, a plurality of laminate layers 34, 35, 36. Of these, there is an inner laminate layer 34 which runs in each case over the inside 23 of the two sandwich cores 31, 32. Furthermore, an outer laminate layer 35 is provided, which runs in each case over the outsides 25 of the two sandwich cores 31, 32. A third laminate layer 36 runs between the inside 23 of the sandwich core 31 for the bottom shell 19 and the inner laminate layer 34, continues in the gap between the sandwich cores 31, 32 and then runs between the outside 25 of the sandwich core 32 for the closing-off web and the outer laminate layer 35.

The three laminate layers 34, 35, 36 comprise in each case one or more plies of fiber material, for example mats made from glass fibers. The fiber plies of the laminate layers 34, 35, 36, illustrated diagrammatically as unbroken lines in FIG. 3, and also the two sandwich cores 31, 32 are embedded in a common resin matrix 38 of cured resin, the surface contours of which are illustrated as dashed lines in FIG. 3. The surface contours of the resin matrix 38 at the same time form the surfaces of the composite fiber component toward the rotor blade interior 22 and toward the rotor blade exterior 24.

FIG. 4 shows diagrammatically a sectional illustration of the composite fiber component 20 in a sectional plane which lies nearer to the blade root 12 and which is illustrated in FIG. 1 by the line C-C.

The set-up of the sandwich laminate of the composite fiber component 20 with two sandwich cores 31, 32 and with three laminate layers 34, 35, 36 corresponds, in principle, to the set-up shown in FIG. 3. However, some differences emerge in detail.

Near the blade root 12, the sandwich cores 31, 32 are arranged at a much flatter angle to one another in order to achieve a uniform transition into the round blade root 12. To form a gap having an essentially constant gap width, both sandwich cores 31, 32 are of wedge-shaped form at the margin in this region. The third laminate layer 36 consequently extends at a flat angle from the inside 23 of the first sandwich core 31 to the outside 25 of the second sandwich core 32, this having a positive effect upon the stability of the connection between the two sandwich cores 31, 32.

Furthermore, to increase mechanical stability, both the sandwich cores 31, 32 and the laminate layers 34, 35, 36 are designed to be thicker at the transition to the blade root 12 than in that region of the fiber composite component 20 which is illustrated in FIG. 3.

All the features mentioned, also the features to be gathered from the drawings alone as well as individual features which are disclosed in combination with other features are considered as essential to the invention either alone or in combination. Embodiments according to the invention may be fulfilled by means of individual features or a combination of a plurality of features.

LIST OF REFERENCE SYMBOLS 10 rotor blade
12 blade root
13 blade nose
14 trailing edge
16 closing-off web
17 girder
18 web
19 bottom shell
19' top shell
20 composite fiber component
22 rotor blade interior
23 inside
24 rotor blade exterior
25 outside
31, 32 sandwich core
34, 35, 36 laminate layer
38 resin matrix

What is claimed is:

1. A rotor blade of a wind power plant, said rotor blade having an aerodynamic profile with a suction side and a pressure side,
    wherein, in a transition region opposite to a profile nose, the rotor blade includes a profile trailing edge that is defined by a closing-off web arranged transversely to a profile chord,
    wherein the closing-off web transitions to the suction side and to the pressure side, respectively, at transitional edges,
    wherein at least at one of the transitional edges of the rotor blade comprises a first sandwich core arranged next to a second sandwich core,
    wherein the first sandwich core and the second sandwich core each have an inside facing a rotor blade interior and an outside facing a rotor blade exterior,
    wherein a first fiber-containing laminate layer is arranged on the inside of the first sandwich core and on the outside of the second sandwich core, wherein a second fiber-containing laminate layer is arranged on the outside of the first sandwich core and on the outside of the second sandwich core, wherein a third fiber-containing laminate layer is arranged on the inside of the first sandwich core and on the inside of the second sandwich core, wherein the first sandwich core and the second sandwich core are arranged at an angle with respect to one another in a region where the first fiber-containing laminate layer passes between them, wherein said angle is defined by the outside of the first sandwich core and the outside of the second sandwich core at the transitional edge, and wherein said angle lies in a range between 25° and 165°.

2. The rotor blade as claimed in claim 1, wherein the rotor blade comprises at least two rotor blade shells.

3. The rotor blade as claimed in claim 1, wherein at least one of the first fiber-containing laminate layer, the second fiber-containing laminate layer and the third fiber-containing laminate layer comprises at least one ply of fiber material which is embedded in a matrix of cured matrix material.

4. The rotor blade as claimed in claim 3, wherein each of the first fiber-containing laminate layer, the second fiber-containing laminate layer and the third fiber-containing laminate layer comprises at least one ply of fiber material which is embedded in a matrix of cured matrix material.

5. The rotor blade as claimed in claim 3, wherein the rotor blade comprises at least two rotor blade shells.

6. The rotor blade as claimed in claim 3, wherein the first fiber-containing laminate layer, the second fiber-containing laminate layer and the third fiber-containing laminate layer have a common matrix of cured matrix material.

7. The rotor blade as claimed in claim 6, wherein the rotor blade comprises at least two rotor blade shells.

\* \* \* \* \*